(12) United States Patent
Homsi et al.

(10) Patent No.: US 8,672,782 B2
(45) Date of Patent: Mar. 18, 2014

(54) SPORTING DEVICES AND STRUCTURES HAVING DYNAMIC VISUAL INDICIA

(75) Inventors: Kristopher Homsi, Portland, OR (US); Vikram Malhotra, Portland, OR (US); Michael E. Schmitt, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 98 days.

(21) Appl. No.: 13/300,989

(22) Filed: Nov. 21, 2011

(65) Prior Publication Data

US 2013/0130848 A1 May 23, 2013

(51) Int. Cl.
*A63B 41/00* (2006.01)

(52) U.S. Cl.
USPC .......................................... 473/570; 473/569

(58) Field of Classification Search
USPC ....................... 473/570, 569; 463/2; 482/1, 8; 273/108.4, 317.5
See application file for complete search history.

(56) References Cited

U.S. PATENT DOCUMENTS

| | | | |
|---|---|---|---|
| 3,353,824 A | 11/1967 | Hamson, Jr. | |
| 3,370,851 A | 2/1968 | Murray | |
| 4,577,865 A * | 3/1986 | Shishido | 473/570 |
| 5,316,293 A * | 5/1994 | Hamilton | 473/570 |
| 5,330,176 A | 7/1994 | Cagney, Jr. | |
| D375,129 S | 10/1996 | Daicos | |
| 5,779,576 A * | 7/1998 | Smith et al. | 473/570 |
| 5,947,845 A | 9/1999 | Canelas | |
| 6,157,898 A * | 12/2000 | Marinelli | 702/141 |
| 6,582,330 B1 * | 6/2003 | Rehkemper et al. | 473/570 |
| 6,722,889 B1 | 4/2004 | Page et al. | |
| 6,852,039 B2 | 2/2005 | Pettigrew et al. | |
| D505,462 S | 5/2005 | Horkan et al. | |
| 7,059,562 B2 | 6/2006 | McGinley | |
| 7,186,184 B2 | 3/2007 | Buck | |
| 7,616,098 B2 | 11/2009 | Al-Sabah | |
| 2003/0109339 A1 * | 6/2003 | Oister et al. | 473/570 |
| 2003/0199344 A1 | 10/2003 | Peterson | |
| 2005/0119071 A1 | 6/2005 | Carbonero | |

(Continued)

FOREIGN PATENT DOCUMENTS

| | | |
|---|---|---|
| EP | 2025372 | 2/2009 |
| EP | 21638282 | 3/2010 |

(Continued)

OTHER PUBLICATIONS

Search Report and Written opinion dated Mar. 19, 2013 for PCT application PCT/US2012/066061.

*Primary Examiner* — Arthur O Hall
*Assistant Examiner* — Allen Chan
(74) *Attorney, Agent, or Firm* — Banner & Witcoff, Ltd.

(57) ABSTRACT

Sporting devices having the ability to provide dynamic indicia are disclosed. Further aspects relate to systems and methods for altering the output of at least one light-emitting/light reflecting device of a sporting device. In one aspect, the selective utilization of dynamic indicia may be implemented in the training or coaching of athletes. In one embodiment, a user input may be received by manipulating a structure traditionally located on a particular type of sporting device or from an external electronic device, including for example, a portable communication device, such as a wireless telephone, media player, tablet, netbook, or notebook computer. Further aspects relate to utilizing sensors to detect a motion parameter of the sporting device and/or an athletic parameter during a selected athletic routine. Certain implementations may utilize data from multiple sporting devices and/or other structures.

31 Claims, 4 Drawing Sheets

(56) References Cited

U.S. PATENT DOCUMENTS

| | | |
|---|---|---|
| 2005/0221919 A1 | 10/2005 | Eite |
| 2006/0148594 A1 | 7/2006 | Saintoyant |
| 2007/0021244 A1 | 1/2007 | Ko |
| 2007/0167266 A1* | 7/2007 | DeVall .................. 473/505 |
| 2008/0206723 A1 | 8/2008 | Hunter |
| 2010/0062883 A1 | 3/2010 | Bevier et al. |
| 2010/0184563 A1* | 7/2010 | Molyneux et al. ............. 482/1 |

FOREIGN PATENT DOCUMENTS

| | | |
|---|---|---|
| GB | 2454518 | 5/2009 |
| WO | 2010065886 | 6/2010 |
| WO | 2011036567 | 3/2011 |

\* cited by examiner

SPORTING DEVICES AND STRUCTURES HAVING DYNAMIC VISUAL INDICIA

BACKGROUND

Athletes, both amateur and professional, often desire to improve their performance for a particular sport or athletic activity. In addition to improving physical prowess, athletes may see large sport-specific improvements with drills directed towards vision, reaction time, or other abilities. Regarding vision, known vision improving exercises and methods often utilize static sporting devices, such that the athlete(s) can readily memorize different patterns. Even if multiple patterns are implemented, they are frequently utilized erroneously, thus negating many of the benefits being sought.

Improper use of equipment or devices may actually lower athletic performance. Similarly, incorrectly administering drills or routines can also prevent the athlete to be properly trained and/or lead to a false conclusion that an athlete is not performing to threshold level.

Therefore, in view of the foregoing, improved sporting devices and methods for utilizing the devices are desirable. Aspects of this invention are directed towards novel systems and methods that address one or more of these deficiencies. Further aspects relate to minimizing other shortcomings in the art.

SUMMARY

Aspects disclosed herein relate to sporting devices having the ability to provide dynamic indicia. Example sporting devices may comprise equipment specifically designed for (or traditionally utilized in) an organized sport or athletic activity, such as football, hockey, baseball and/or soccer. For example, the sporting device may be a football, soccer ball, puck, bat, among others. Visual indicia may be provided by a light-emitting/light reflecting device configured to provide a visually-perceivable output from an outer surface of the sporting device. Display device(s) may include one or more chromatic materials. In one embodiment, a display device comprises an electro chrome. The sporting device may include a memory that comprises computer-executable instructions that when executed by a processer perform one or more methods, including altering an output of a light-emitting/light reflecting device.

In one embodiment, the sporting devices may comprise a power scavenging device that may receive power from an athlete utilizing the sporting device. For example, scavenging device may receive power from the rotation of an American football's spiral motion during a pass or from rotation of a soccer ball after being kicked.

Further aspects relate to systems and methods for altering the output of at least one light-emitting/light reflecting device of a sporting device. In one aspect, the selective utilization of dynamic indicia may be implemented in the training or coaching of athletes. In one embodiment, a user input may be received by manipulating a structure traditionally located on that particular type of sporting device. For example, in one embodiment, laces of an American football may be utilized in the reception of a user input. In yet other embodiments, a user input may be received from an external electronic device, including for example, a portable communication device, such as a wireless telephone, media player, tablet, netbook, or notebook computer.

Further aspects relate to utilizing sensors to detect a motion parameter of the sporting device and/or an athletic parameter during a selected athletic routine. Based upon information regarding the detected parameter(s), a visual indicia that represents the detected parameter(s) may be provided on the sporting device. Sensors may be located within and/or external to the sporting device. In this regard, certain implementations may utilize data from multiple sporting devices and/or other structures.

Different indicia may be displayed to visually convey different detected parameters to multiple athletes. In another embodiment, information regarding the detected parameters may be utilized to associate a first selection with a different visual indicia. This may be utilized, for example, to adjust a difficulty of an exercise that utilizes visual indicia. In other embodiments, a visually-perceivable property of a light-emitting/light reflecting display may not be altered unless a performance threshold has been exceeded. In one embodiment, a specific indicia may not be provided unless two or more athlete's exceed a performance threshold. For example, a first athlete may be required to throw (e.g., either by passing or pitching) a sporting device in accordance with certain characteristics (e.g., speed, rotation along an axis, etc.) and a second athlete may be required to interact (e.g., catch or hit with a bat) in accordance with certain characteristics (e.g., interaction with a catch or strike zone) for a specific visual indicia to be displayed. In yet other embodiment, a totality of athletic interactions may be utilized to provide visual indicia on the sporting device.

DETAILED DESCRIPTION

Aspects of this disclosure relate to systems and methods for providing a range of dynamic visual indicia. In one aspect, one or more dynamic visual indicia or patterns may be provided on one or more sporting devices, such as sporting device 100 and/or football 300 shown below in relation to FIGS. 1 and 3-5, respectively. The utilization of visual indicia or patterns, however, is not limited to example sporting device 100 and/or football 300, but may be applied to any apparatus, tool, and/or equipment utilized either passively or actively, during a fitness, athletic or sporting activity. Example sporting devices may include, but are not limited to: golf balls, basketballs, baseballs, soccer balls, footballs, powerballs, hockey pucks, weights, bats, clubs, sticks, paddles, mats, and combinations thereof. Thus, any physical item that may be manipulated (either directly or indirectly) by an athlete during an athletic activity is within the scope of this disclosure. In certain embodiments, a sporting device may be attached to or worn by a user, such as gloves and/or shoes. In certain embodiments, the sporting device can include sporting equipment specifically designed for (or traditionally utilized during) a specific organized sport or athletic activity.

In further embodiments, one or more sporting structures may include one or more visual indicia. Example sporting structures may include, but are not limited to objects within a sporting environment for utilization with or during a specific sport or fitness activity, including for example: a goal, net, hoop, backboard, portions of a field, such as a midline, outer boundary marker, base, and combinations thereof. In this regard, those skilled in the art will appreciate that one or more sporting devices may also be part of (or form) a sporting structure and vice-versa. A sporting structure may comprise one or more sporting devices or be configured to interact with a sporting device. Illustrative embodiments generally described throughout this provided below are described in relation to example sporting devices; however, those skilled in the art with the benefit of this disclosure will appreciate that any discussion herein applies to sporting structures as well, unless expressly indicated otherwise.

Figure 1:
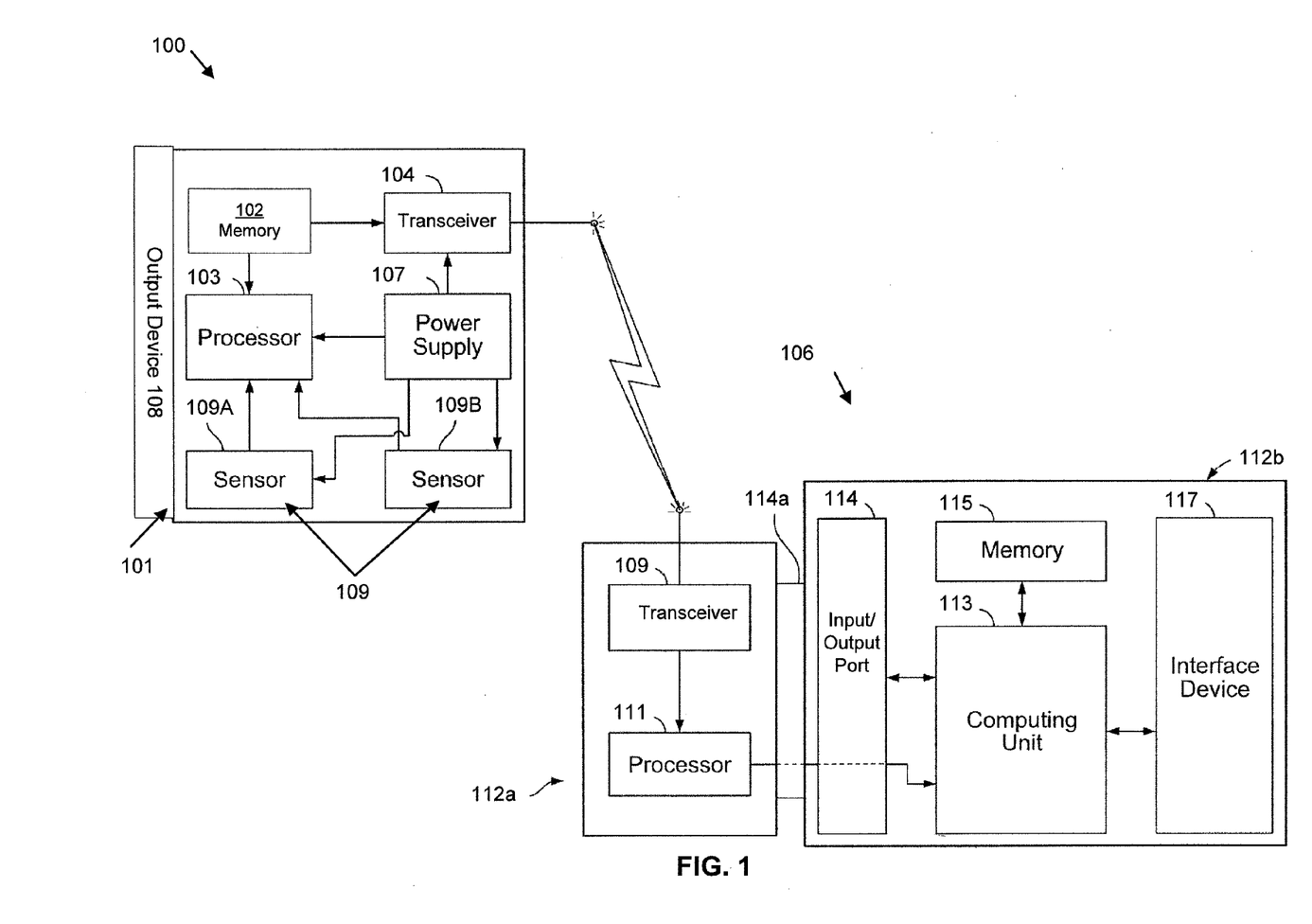
FIG. 1 shows an example sporting device in communication with an external electronic device in accordance with one embodiment of the invention.

FIG. 1 shows an illustrative sporting device 100, which may include an encasement, such as represented by portion 101. If, for example, sporting device 100 is a sporting ball (such as a football, soccer ball, basketball, etc.), portion 101 may comprise the outer surface of the respective ball. Yet, in other embodiments, portion 101 may form (or be a portion of) a housing, encasement, or compartment of sporting device 100, in which one or more materials separate portion 101 from an outer surface of sporting device 100. For example, insulation or energy absorbing materials may be positioned between an outer perimeter of sporting device 100 and portion 101. However, for simplicity, reference to portion 101 and/or an outer surface of a sporting device, such as device 100, are utilized interchangeably, however, one skilled in the art will appreciate that portion 101 is not required to be the outer-most surface of sporting device 100.

Sporting device 100 may further comprise one or more computer-readable medium(s), such as memory 102. Memory 102 may include read-only memory (ROM) and/or random access memory (RAM). Memory 102 may include any type of one or more non-transitory computer readable medium, including, optical, magnetic, disc, solid state, such as flash memory, and combinations thereof Memory 102 may comprise computer-executable instructions, that when executed by a processor, such as processor 103, perform one or more operations, such as for example, methods for dynamically providing visual indicia on the sporting device 100. An example method for dynamically providing visual indicia is discussed below in relation to FIG. 2.

Processor 103 may be a programmable microprocessor, yet in other embodiments, processor 103 may be a purpose-specific circuit device, such as an ASIC. Although both memory 102 and processor 103 are shown to be fully encased within sporting device 100, those skilled in the art with the benefit of this disclosure will appreciate that memory 102 and/or processor 103 may be external to sporting device 100. For example, processor 103 and/or memory 102 may optionally be in operative communication with, and as such may provide processed or raw signals to, transceiver 104 for transmission to an electronic device, such as device 106 (discussed in more detail below).

In certain embodiments, power supply 107 may be configured to provide power to transceiver 104, memory 102, processor 103, and/or other internal or external components of sporting device 100. The power supply 107 may be configured to accept either alternating current (AC) and/or direct current (DC). In certain embodiments, power supply 107 may comprise a converter for converting energy between AC and DC power. In one embodiment, power supply 107 may comprise or be in communication with a power scavenging device, such as for example, to obtain energy from the motion of sporting device 100. For example, the "spiral" rotation of an American football or spinning action of a baseball in flight may be utilized for energy generation. Likewise, the swinging of or contact with a bat, club or stick may also be utilized Similarly, the rotation of a puck could also be utilized for the capturing of energy. Yet, in other embodiments, power supply 107 may obtain energy from the sporting environment, such as from solar power.

Power supply 107 may be configured to provide power to one or more display devices to provide dynamic visual indicia on sporting device 100. In one embodiment, outer-surface 101 of sporting device 100 may comprise one or more materials configured to emit light. Yet in another embodiment, at least a portion of outer surface 101 may be transparent and/or translucent, such as to allow the passage of visible light from within an interior portion of the sporting device 100 to be visible on the portion 101 and/or an outer perimeter of the sporting device 100. In another embodiment, at least a portion of outer surface 101 may be reflective, e.g., either statically or dynamically, or both. In still other embodiments, a combination of the above or other properties may be provided, so as to enable visually-perceivable output. Output of visual indicia may be performed through one or more output devices, such as illustrative output device 108.

Example output device 108 may comprise one or more display devices associated with a video adapter configured to control an array having a plurality of pixels. A plurality of pixels may be configured to display different color spectrums. For example, red, green, white and blue light sources, such as LEDs, may be driven by red, green, white and blue input signals respectively and may be positioned on a black background. Those skilled in the art will appreciate that a combination of red, green and blue LEDs allows for the generation of a wide variety of other colors. In alternative embodiments, other primary color combinations may be used. For example, magenta, cyan and yellow light emitting diodes may be utilized. Further, an LED array may be replaced with or used in combination with other light generation and display components such cathode ray tubes (CRTs), liquid crystal displays (LCDs), field emission displays (FEDs), plasma displays or any other device that produces a visual indicia that is viewable external to the sporting device 100.

Further embodiments may utilize one or more chromatic materials, either alone, or in addition to one or more other materials providing visually-perceivable properties, as output device 108. Chromatic materials (also known as chromic materials) may include, for example, electro chromatic, thermo chromatic and/or photo chromatic materials. In one embodiment, at least a portion of outer surface 101 comprises one or more chromatic materials. In one embodiment, chromatic material(s) may be provided on a portion of sporting device 100 through one or more processes, including but not limited to: screen-printing, stenciling, and printing. For example, stenciling may be performed to provide one or more patterns shown in FIGS. 3-5 on an American Football. Those skilled in the art with the benefit of this disclosure will appreciate that any pattern or collection of patterns may be stenciled on a myriad of sporting devices (as well as sporting structures). In another embodiment, a film of material, including for example, PET, may be printed with chromatic material(s) before application on a location of sporting device 100. Yet, in other embodiments, glass or other structures may be utilized as a substrate for one or more chromatic materials.

Application to sporting device 100 may include at least one mechanical bonding process, such as stitching, and/or at least one chemical process, such as utilizing an adhesive. In one embodiment, one or more electro chromatic materials (electro chromes) are polymer based. In another embodiment, one or more metal oxide films are utilized as electro chromes. Examples include, but are not limited to: cobalt oxide, indium tin oxide, iridium tin oxide, molybdenum trioxide, nickel oxide, tungsten trioxide, vanadium pentoxide, cerium oxide, niobium pentoxide, and/or ruthenium dioxide. In yet another embodiment, one or more organic inks may be utilized as an electro chrome. Example organic dyes include, but are not limited to: phthalocyanine complexes, bipyridilium systems, carbazoles, methoxybiphenyl, quinones, diphenylamine and/or pyrazolines. Still other materials may be employed, e.g., titanium dioxide in conjunction with viologen.

Power supply 107 may be configured in controlling one or more chromes. In one or more embodiments, power supply 107 may be configured so that one or more thermo chromes are controlled via application of selected thermal signals. In any such embodiment, power supply 107, together with processor 103, may deliver selected or various heat output(s) to one or more portions of thermo chrome(s) comprising output device 108. In one or more other embodiments, power supply 107 may be configured to provide an adjustable electronic signal (such as for example, a power level) to one or more electro chromes. In one embodiment, different signals result in different visual indicia on sporting device 100. In one embodiment, one or more bistable materials may be utilized in which a first electronic signal (which may be zero volts/amps or otherwise below a minimum threshold of power) applied to the electro chrome(s) may result in switching the electro chrome(s) from a first state to a second state. In one embodiment, a temporary application of power may result in the material(s) resting at a second state until a second power level is applied to the materials. After the transition from the first state to the second state is complete, a bistable electro chrome may continue to draw small, a negligible amount of, or zero, power to stay in that second state. In one embodiment, application of a first electronic signal may result in at least one electro chrome appearing substantially transparent. Thus, the substantially transparent electro chrome may not form part of a specific visual indication on sporting device 100. Yet, in another embodiment, the first electronic signal (which may be zero volts or below a threshold of minimum power) may be substantially opaque such as to form part of a visual indication. Application or alteration of an electronic signal may reverse the at least one electro chrome from substantially transparent to opaque and/or vise-versa from opaque to substantially transparent.

In yet further embodiments, one or more electro chromes may provide a plurality of visually-distinctive states. For example, upon receiving no electronic signals or below a threshold level of electronic signals, a first electro chrome may be in a first state. For example, at a first state, the electro chrome may be substantially transparent. Yet, the first electro chrome may be altered upon application of a second electronic signal, such that it's visual appearance is visually-distinct from the first state when viewed external to the sporting device 100, to be at a second state. For example, in one embodiment, the electro chrome may be altered from being substantially transparent to being a first color. Still yet in further embodiments, the visual perception of the electro chrome (when viewed from the external side of the sporting device 100) may be altered to be a third state, such that it is visually distinct from the second state. For example, at a third state, the same electro chrome may be a second color that is visually-distinct from the first color.

Figure 2:
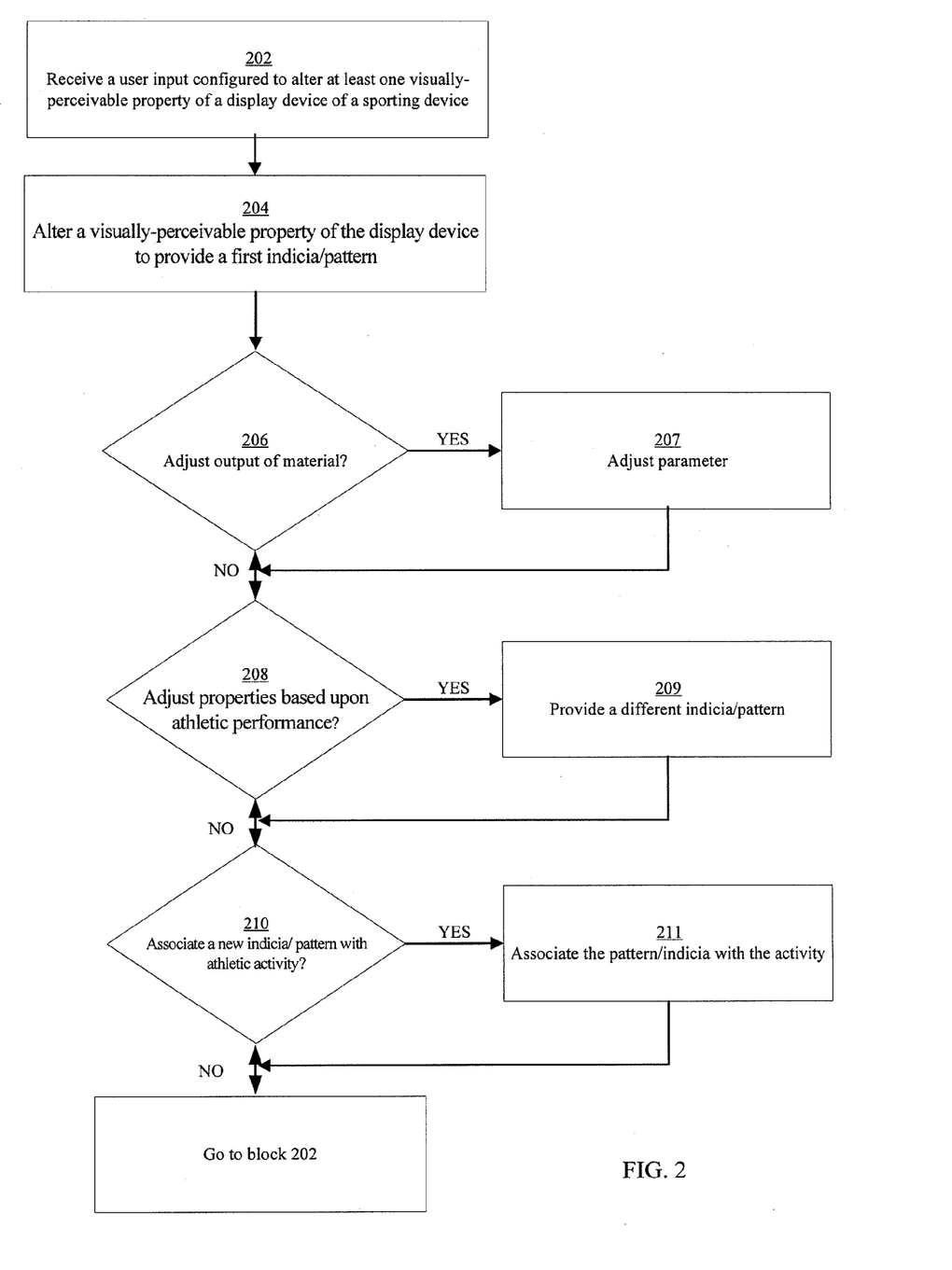
FIG. 2 is a flowchart of an example method for altering a one or more visual properties of a material of a sporting device or sporting structure in accordance with an embodiment of the invention.

In accordance with certain aspects, methods for adjusting the visually-perceivable properties of sporting device 100 or a sporting structure may be utilized in the provisioning of visual cues to an athlete. FIG. 2 is a flowchart of one example method for utilizing dynamic visual indicia in accordance with one embodiment of the invention. In accordance with one embodiment, a user input configured to alter a visually-perceivable property of at least one material (or device) of a sporting device, such as sporting device 100, may be received. The user input may be configured to select one of a several selections that each alters a visually-perceivable property of at least one material of sporting device 100 (see, e.g., block 202). The user input may be received from one or more users. Users may include, but are not limited to: athletes and/or coaches. For example, a first user input may be configured to cause a pattern, such as a first visual display/indicia, to be provided on an outer surface of sporting device 100. Example displays, indicia, or patterns may include, but are not limited to, any of the one or more displays shown in FIG. 3-5 on football 300. A first display or indicia may comprise one or more patterns that may be utilized in a fitness routine. An example fitness routine may be focused on hand-eye coordination, yet another routine may be focused on accuracy or preciseness of an athlete's performance during the fitness routine.

In contrast, the selection of a second or further selection at block 202 may result in the provisioning of a second or further pattern, such as a second visual display or visual indicia, to be provided on an outer surface of sporting device 100. The second pattern may differ from the first pattern in one or more aspects, including, size, shape, color, position, orientation, location, brightness, and combinations thereof.

Dynamic visual display devices may be utilized in a reversible manner on a sporting device (or structure). In this regard, in contrast to standard visual indicia commonly utilized on sporting devices, a first visual display device may be provided at a first location and/or orientation on a sporting device and be selectively displayed during a first time period. Likewise, a second visual display may be provided (either in conjunction with or in the absence of a first visual display) on a second location and/or orientation during a second time period. The second visual display may overlap (either fully or partially) the location of the first visual display or vice versa.

Figure 3A:
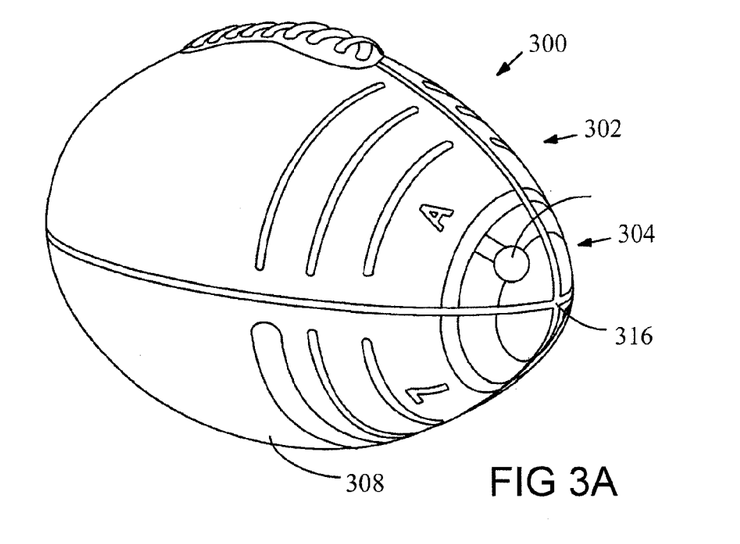
FIG. 3A is a front, isometric view of an example on-field vision training system configured for use on an American football in accordance with an embodiment of the present invention.
Figure 3B:
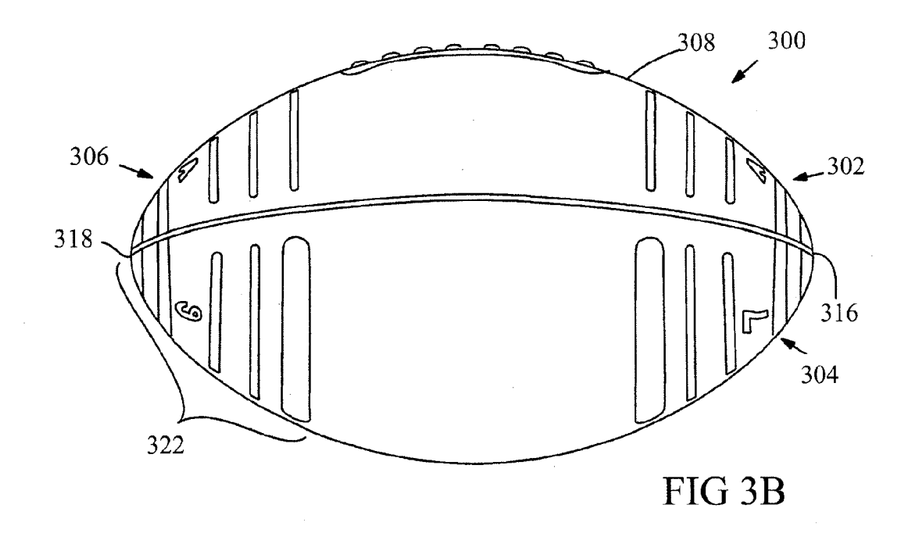
FIG. 3B is a side view of the football of FIG. 3A.
Figure 4:
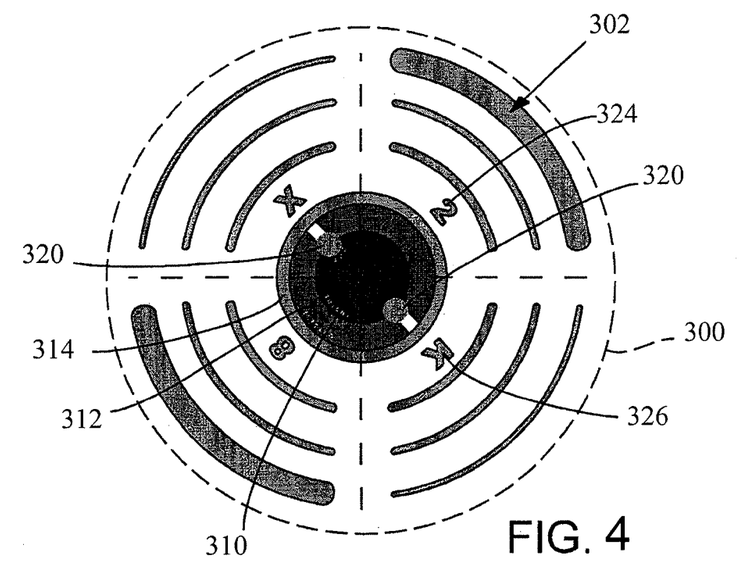
FIG. 4 is an example visual display pattern for use on a first end of the football of FIG. 3A.
Figure 5:
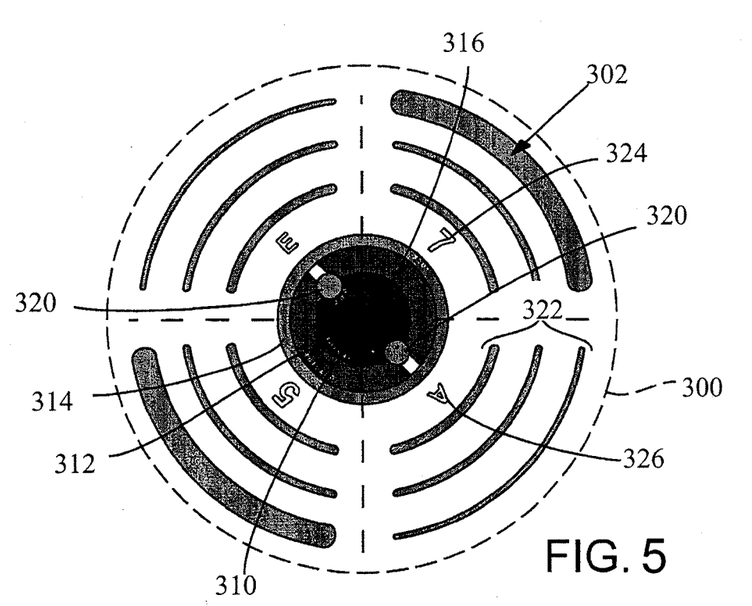
FIG. 5 is an example visual display pattern for use on a second end of the football of FIG. 3A.

Looking briefly to the example sporting device shown in FIGS. 3-5, football 300 exhibits a first pattern or indicia that may form one or more patterns (e.g., 302, 304 and/or 306). Patterns, such as patterns may be located on or transparent with respect to an outer surface of football 300, such as surface 308. One or indicia or patterns created from indicia may include the series of concentric, different colored circles/rings 310, 312, 314 (shown at FIGS. 4 and 5) extending from the respective ends 316, 318 of the football 300 (see, e.g., FIGS. 3B and 5). Yet, a second pattern may be devoid of circles 310, 312, and/or 314. In one embodiment, the second pattern may comprise different sized and/or colored circles that replace circle(s) 310, 312, 314. In still yet other embodiments, a second pattern may be devoid of any circles/rings. For example, in one embodiment, one or more different geometric patterns may be provided as visual indicia. Yet, in another embodiment, the first pattern may be devoid of any shapes and/or colors presented by the second pattern. The visual-indicia may be utilized in the formation of a plurality of patterns. In this regard, a pattern may be user-selected from one or more predetermined sets of patterns. In certain embodiments, users may create, or build new patterns as well as modify existing patterns. A display device may be utilized to display available or existing patterns, and in certain embodiments, permit the user to observe modifications to existing patterns. In further embodiments, one or more patterns may be downloaded via a wireless or wired connection and/or transmitted to sporting device 100 such as ball 300 via a wired and/or wireless connection. Further, patterns may be automatically altered based on sensor detected criteria, e.g., relating to performance on either side of the throwing or catching end of football 300. Those skilled in the art with the benefit of this disclosure will appreciate that any types of patterns may be used, and may depend on the intended fitness routine to be performed by one or more athletes.

In this regard, aspects relate to one or more computer-readable medium(s) comprising computer-executable instructions, that when executed, perform methods for dynamically providing visual indicia on a sporting device. In certain embodiments, the user input at block 202 (or other method described herein) may be received from physical contact with the sporting device 100. For example, a physical structure of sporting device 100 may be manipulated to provide one or more user inputs. The physical structure may, but is not required to be, located on an outer surface (e.g., portion 101) of sporting device 100. The physical structure may be a "fitness component" of sporting device 100. As used herein, a fitness component is any physical structure that is conventionally understood by an athlete regularly engaged in an athletic activity that routinely utilizes the sporting device 100 to be part of (such as being integral with, part of, or otherwise connected with) that type of sporting device 100. Thus, a fitness component may not consist solely of a switch (or other component) that is only provided to receive the user input. Rather, an example fitness structure may be, for example, laces, such as laces on an American football. Thus, a switch, actuator, or other non-obtrusive mechanism may be positioned such that manipulation of the fitness structure actuates the switch, actuator or other non-obtrusive mechanism. In one embodiment, different laces or group of laces may be manipulated by an athlete or other individual to select one or more user inputs. For example, manipulation of a first lace may provide a first user input and manipulation of a second lace may provide a second user input. Alternatively, a single lace may be manipulated in different manners to provide multiple different user inputs. In this regard, sporting device 100 may comprise one or more sensors, such as sensor(s) 109 (which may comprise illustrative sensors 109A and/or 109B), that may be utilized to receive a user input; such as the user input received at block 202. Sensor(s) 109 may be in operative communication with one or more structures, including for example, a fitness structure. Although sensors 109A and 109B are depicted within sporting device 100, those skilled in the art will appreciate that one or more sensor or other device configured to receive a user input may be located outside (either partially or entirely) of portion 101.

In other embodiments, an athlete's physical activity with the sporting device 100 during a fitness routine or activity may be a user input received at block 202. For example, one or more sensors, such as sensors 109A and/or 109B, may be configured to detect motion parameters of either the sporting device 100 and/or an athlete. Example motion parameters and inputs are described below in relation to blocks 206-210; however, those skilled in the art with the benefit of this disclosure will readily appreciate that such athletic actions or other motion parameters may be utilized as a user input in relation to block 202.

In other embodiments, a user input, such as an input received at block 202, may be received from an electronic device that is external to the sporting device 100. As shown in the illustrated embodiment of FIG. 1, electronic device 106 may be in wireless communication with sporting device 100. Wired communication protocols may also be utilized, such as but not limited to a Universal Serial Bus ("USB") connection that permits selective connection between the sporting device 100 and another electronic device. Electronic device 106 may optionally comprise two or more detachable components, such as for example, components 112a and/or 112b. For example, component 112a may be a relatively smaller component than component 112b. In one embodiment, component 112b may comprise a mobile terminal device and/or a personal media player and component 112a may provide further functionality to component 112b. Component 112a may connect to component 112b such that processor 111 may communicate with computing unit 113 of electronic device 106. Processor 111 may communicate directly with computing unit 113, and in certain embodiments, be a part of computing unit 113. Component 112a may also communicate with computing unit 113 and other portions of component 112b through input/output (I/O) interface 114, using one or more channels, such as channel 114a. In certain embodiments, for example, where 112a is not detachable, I/O interface 114 may be excluded. Further, processor 111 of component 112a and/or computing unit 113 of component 112b may be redundant or otherwise not required in certain embodiments.

Computing unit 113 may comprise a processor configured to read and/or write data to memory 102 and/or 115. Example data may include raw or processed signals from sensors 109. Computing unit 113 may further operate on processed signals provided by one or more fitness devices, such device 100, for example, to generate a set of athletic data corresponding to athletic activity performed by an athlete and/or motion parameters of sporting device 100. Computer-executable instructions may be located on a memory, such as memory 115. Example computer-executable instructions may include one or more processes discussed herein, including but not limited to include performing operations on the output from sensor(s) 109, such as curve smoothing, noise filtering, outlier removal, amplification, summation, integration, or the like.

Electronic device 106 may further comprise I/O interface device 117. I/O interface device 117 may comprise one or more ports or interfaces (or devices connected through such ports or interfaces) configured to receive an input or transmit an output. In one embodiment, wired communication protocols may also be utilized, such as but not limited to a Universal Serial Bus ("USB") connection that permits selective connection. In certain embodiments, I/O interface device 117 may comprise a wireless data "port," such as a Bluetooth interface, a Wi-Fi interface, an infrared data port, or the like. In certain embodiments, I/O interface device 117 and/or transceiver 104 may be utilized to obtain computer-executable instructions that when implemented by a processor, such as processor 111 and/or 103, result in different patterns or indicia to be displayed on sporting device 100.

At block 204, a visually-perceivable property of the at least one material or device, such as output device 108, of sporting device 100 may be altered. In certain embodiments, the material may comprise a material or device that is light emitting, light reflecting, or a combination. In accordance with one embodiment, altering the visually-perceivable property may be the result of (either directly or indirectly) of the user input received at block 202. Example visually-perceivable properties that may be altered may include: color, brightness, active or inactive, timing of property adjustment, size, location and/ or combinations thereof. One or more properties may be altered to provide the first visual indicia, pattern, or display. Other factors besides the user input received at block 202 may contribute to the alteration of one or more visually-perceivable properties at block 204.

Looking briefly to the example sporting device (football 300) of FIGS. 3-5, a first pattern or indicia that may be utilized on an American football 300 is shown. The pattern or indicia may include a series of concentric, different colored circles/rings 310, 312, 314 extending from the respective ends 316, 318 of the football 300 as best shown in FIG. 3A. The center circle 310 may be different colors on each end 316, 318 of the football 300, with a first concentric ring 312 extending therearound in a different color from the color of the adjacent center circle 310. A second concentric ring 314 may be provided (either as part of a first or second visual indicia) and may be altered to display a different color from the adjacent center ring 310 and first concentric ring 312. In accordance with one embodiment, a first visual indicia may have a red center circle 310, blue first concentric ring 312, and yellow second concentric ring 314 on one side 316 (FIG. 5) of the football 300, and a blue center circle 310, red first concentric ring 312, and yellow second concentric ring 314 (FIG. 4) on the opposite side 318 of the football 300. In one embodiment, a first athlete may place the football 300 to position one of the two sides 316, 318 toward a second athlete, and throw the football 300 so-placed toward the second athlete. The second athlete may call out the color (red or blue) of the center circle 310 directed toward them while the football 300 is in flight.

In certain embodiments, at least one alteration does not occur until a predefined criterion is met. In this regard, block 204 may incorporate one or more other inputs or determinations, such as example determinations 206, 208, and/or 210 shown in FIG. 2. Although blocks 206, 208 and 210 are shown below block 204, those skilled in the art will readily appreciate that one or more blocks 206, 208, and/or 210 may occur before, during and/or after one or more processes of block 204. Further, the ordering of blocks 206, 208, and 210 is merely for illustrative purposes.

At optional decision 206, it may be determined whether to adjust the output of a material, such as output device 106. In one embodiment, decision 206 may be implemented to alter the visually-perceivable property(ies) only upon detecting that sporting device 100 is in motion (or meets a threshold of motion) during a fitness event or routine. For example, a first visual indicia may not be provided on an American football until that ball is thrown or may not be provided on a soccer ball until that soccer ball is kicked. This may be useful as to prevent or minimize the potential of an unfair advantage that allows the receiver to know a pattern before the ball is in motion during the routine. In another embodiment, one or more patterns may be utilized to set/reset the "catch zone" of a ball, such as the football as best shown in FIGS. 3A & 3B. Such patterns or indicia may offer a visual indicator to the athlete as to where he or she should seek to catch the ball 300.

As an example using football 300 of FIGS. 3-5, the size of the center circle 310 and rings 312 and 314 can also be optimized for maximum visual training. In one embodiment, a fist pattern may have a larger circle 310 and/or rings 312, 314 than that provided in a second pattern. Further routines may utilize patterns or indicia not associated with other routines. For example, a pair of small brightly colored circles 320 may be positioned opposite each other so as to straddle the ends 316, 318 as shown for one pattern but not another. In further embodiments, a plurality of elongate, concentrically aligned, spaced apart lines 322 are provided along the "catch zone" of the football as best shown in FIGS. 3A & 3B. Under certain implementations, these lines may offer a visual indicator to an athlete as to where he or she should seek to catch the ball. In yet another embodiment, end 316 (shown in FIG. 5) of the football 300 may have a smaller sized center circle 310 and rings 312 and 314, than those that would have been provided if certain performance characteristics and/or motion parameters were not detected (such as during block 210) during a previous routine. Accordingly, in one implementation, as an athlete's vision training improves using a first visual pattern, a more difficult visual pattern (or plurality of patterns) may be utilized to improve vision training. One or more patterns may be utilized to mark the "catch zone" of the football 300 or to assist perfecting a mechanism at which the athlete is deficient. Obviously, other sporting devices may have other "zones" such as a "strike zone" or the like.

In addition, one or more numbers 324 and/or letters 326 may be provided on a sporting device, such as football 300. These numbers 324 and letters 326 allow for vision training exercises such as number/letter call-out drills to be performed with an in-flight football.

In accordance with other embodiments, sporting device 100 may comprise one or more sensors, such as sensor(s) 109, configured to provide information that may be utilized, either independently or in conjunction with, other sensors, such as one or more sensors associated with one or more sporting devices or sporting structures. For example, a sporting device 100 may comprise sensors configured to measure a force and/or a direction of the force. As one example, sensor(s) 109 may comprise a sensor in a basketball and another sensor may be positioned on a backboard of a basketball court. Sensor(s) 109 may include a removable accelerometer module that is configured to detect acceleration. The accelerometer module may be replaceable with a different sensor (i.e., a pressure sensor). Using removable sensors may permit a sensor, such as sensor 109A to be used with several different fitness devices, such as soccer balls, powerballs, footballs, and/or allow a user to upgrade or replace a faulty device, without having to obtain a new sensor. In certain embodiments, placement of one or more sensors 109 may be configured so that the weights of the included sensor(s) 109 do not change the balance or center of gravity of the sporting device 100. Those skilled in the art will appreciate that sensors 109 are not limited to accelerometers or force sensors, but rather any other type of sensors may be incorporated. For example, a sensor may comprise a gyroscope, camera, thermometer, or otherwise.

In one embodiment, upon receiving an indication that sensor(s) 109 detected a parameter above a threshold, block 207 may be implemented to adjust the visually-perceivable property. For example, upon detection of a ball being thrown, block 207 may initiate the displaying of the first pattern/indicia as selected by the first user input of block 202. In yet, another embodiment, block 207 may adjust the first pattern/indicia such that the displayed pattern/indicia on sporting device 100 is not the same (but may be similar to) the first pattern resulting from the selection at block 202. For example, in one embodiment, sensor(s) 109 may detect that a soccer ball was kicked higher than intended for the fitness routine associated with the selected user input, thus a second pattern may be displayed on sporting device 100. The second pattern may be larger in size (as compared to the first pattern) to permit the receiver to better perceive it. Alternatively, the coloration, brightness or any other property of a light-emitting/light reflecting material of sporting device 100 may be adjusted.

In yet another embodiment, the first pattern remains displayed on the sporting device 100, however, a second pattern/ indicia is displayed at block 207 in addition to the first pattern. For example, the first pattern/indicia may be the pattern selected to be displayed for a particular training drill. Upon the sporting device 100 being put in motion, it may be determined (such as from sensors 109) that a motion parameter is above a particular threshold, therefore, a second pattern, may be displayed to provide additional information. Example motion parameters may be related to: speed, rotation, acceleration, force or combinations thereof. The pattern displayed at block 207 may be orientated to provide visual information to the athlete who placed sporting device 100 in motion, an intended receiver of sporting device 100, a spectator, or combinations thereof. In one embodiment, if a first athlete throws an American football with a "spiral" that falls outside a threshold of acceptance, then one or more visual properties of the first pattern/indicia may be adjusted to more easily permit a second athlete to receive the football. Further, data regarding the motion parameter and/or the displayed pattern(s) may be stored on a memory, such as memory 102, and/or transmitted (including in real-time) to external memory 115.

Either as part of decision 206 or as a separate decision, one or more visually-perceivable properties may be adjusted based upon athletic performance. In this regard, block 208 may be implemented as a sub-component of 206 or implemented in methods in which decision 206 is absent. In one embodiment, decision 206 may measure one or more sensor outputs to determine performance of a first athlete, such as an athlete who throws or kicks a ball. Accordingly, block 207 may adjust a visually-perceivable property based upon properties of the first athlete's kick or throw. In contrast, decision 208 may be implemented to alter at least one visual-perceivable property (thereby providing a new pattern/indicia at block 209) upon detecting a second athlete has caught or received the ball. Thus in the above embodiment, decision 208 may measure the athletic performance of the second athlete, whereas the determination at decision 206 may be more akin to a binary determination as to whether the ball was thrown or not. The new indicia/pattern of block 209 may show locations where the user made contact with the ball (i.e., actual receiving locations). In further embodiments, a pattern may provide an indication of optimal receiving locations.

During use of the sporting device, athletes may utilize visual patterns as visual cues to assist with focus and concentration. The visual displays may be incorporated into a wide variety of in-flight ball, route, passing and hand-eye coordination drills. In other embodiments, visual patterns may be utilized to provide information to spectators, such as concerning motion parameters.

In further embodiments, optional decision 210 may be implemented, either alone or in combination with other decision processes (such as 206 and/or 208), to determine whether to associate a new visual display/indicia or pattern with the selected user input 202 or other user input. For example, if an athlete shows improvement during fitness routine or activity it may be desirable in certain embodiments to alter the displayed visual patterns associated with that fitness activity (e.g., see block 211). For example, in one embodiment, sensor(s) 109 may detect that an athlete received sporting device within a proper "catch zone". In another embodiment, sensor(s) 109 may collect data regarding other parameters of an athlete physically interacting with sporting device 100. Examples include, but are not limited to: stopping a hockey puck with a stick, hitting a baseball with a bat, throwing a basketball, which may interact with a sporting structure, such as a backboard and/or rim. Thus, methods (which may be executed as part of block 211) may be implemented to transmit an electronic signal indicative of one or more interactions, including performance characteristics of an athlete and/or motion characteristics of sporting device 100. Those skilled in the art will understand that in at least some embodiments, motion characteristics and performance characteristics, may be the same, overlapping, or otherwise associated. In one embodiment, block 211 may adjust the difficulty level of a training routine or a portion thereof, by adjusting one or more display patterns, indicia or devices.

Thus, a subsequent use of sporting device 100 may be associated with a different pattern, indicia, or device due to one or more performance characteristics of the athlete or motion characteristics of the sporting device 100 itself. In certain embodiments, one or more of blocks 207, 209 and/or 211 may not be implemented. In the illustrative embodiment of FIG. 13, block 202 may be initiated whether one or more other actions (including blocks 207, 209, and/or 211) are conducted.

In accordance with certain embodiment, dynamic indicia may be utilized to provide a series of sport-specific vision exercises to improve visual skills on the field and thereby improve an athlete's performance on the field of play. In one embodiment, certain visual indicia may be designed to work the athlete's visual, neural and/or cognitive systems through a specific sequence of exercises which have been suggested or proven to improve sports visual performance. The order and sequence of visual indicia may be organized specifically to enhance the performance of the eyes for a particular sport activity.

With one or more sporting devices or structures marked as described, it can be appreciated that an athlete may utilize visual devices to assist with focus, concentration, sport-specific improvements, or other activities and may be incorporated into a wide variety of in-flight ball, route, passing and hand-eye coordination drills.

Having described and illustrated example embodiments with reference to the illustrative figures hereof, it will be apparent that the invention can be modified in arrangement and detail without departing from such principles. For example, the sporting events, structures, and devices shown and the symbols displayed are exemplarily only. In view of the many possible embodiments to which the principles may be put, it should be recognized that the described embodiments are illustrative only and should not be taken as limiting the scope of the many aspects of the invention. Accordingly, we claim as our invention all such modifications as may come within the scope and spirit of the following claims and equivalents thereto.

We claim:

1. A sporting device comprising:
    a display device comprising at least one electro chrome configured to provide a visually-perceivable output from an outer surface of the sporting device; and
    a processor and a non-transitory computer-readable medium, wherein the computer-readable medium comprises computer-executable instructions that when executed by the processer perform a method comprising:
    receiving an electronic signal indicative of a user input selecting one of a plurality of selections, wherein each of the selections are configured to alter a visually-perceivable property of the output of the display device, wherein a first selection is configured to alter the output to provide a first visual indicia that illuminates an outer surface of the sporting device and a second selection is configured to alter the output to provide a second visual indicia that illuminates the outer surface of the sporting device;

wherein the first visual indicia is further configured to be utilized during a first athletic routine with the sporting device and the second visual indicia is configured to be utilized during a second athletic routine with the sporting device, wherein the first and second athletic routines each improve a single sport-specific skill; and altering a visually-perceivable property of the output of the display to provide the first visual indicia upon receiving the first selection comprising the switching of the electro chrome from a substantially transparent state to a second state in which the first electro chrome exhibits a first color while at the second state.

2. The device of claim 1, wherein the first and second athletic routines each comprise a sport-specific training exercise.

3. The device of claim 2, wherein the first athletic routine is a sporting event with at least two opposing athletes and conducted in association with defined rules.

4. The device of claim 1, wherein the display device comprises at least two electro chromes and wherein the computer-readable medium comprises computer-executable instructions that when executed by a processor perform the method of:

switching the second electro chrome from a first state to a second state responsive to receiving an electronic signal indicative that a user input selects the second athletic routine.

5. The device of claim 1, wherein the display devices further comprises at least one material selected from the group consisting of: thermo chrome, photo chrome, and combinations thereof.

6. The device of claim 1, wherein the user input is received from a fitness structure of the sporting device.

7. The device of claim 6, wherein the sporting device is an American football and the sporting device comprises at least one lace of the American football.

8. The device of claim 1, wherein the user input is received from an external electronic device.

9. The device of claim 8, wherein the sporting device comprises a wireless transceiver configured to communicate with the external electronic device.

10. The device of claim 9, further comprising:

a sensor configured to detect a motion parameter of the sporting device during a selected athletic routine; and the computer-readable medium further comprises computer-executable instructions that when executed by the processor perform a method comprising:

during the performance of the first athletic routine with the sporting device, detecting a parameter selected from the group consisting of: an athletic performance parameter, a motion parameter of the sporting device, and combinations thereof; and transmitting information regarding the detected parameter to the external electronic device.

11. The device of claim 10, wherein the computer-readable medium further comprises computer-executable instructions that when executed by the processor perform a method comprising:

responsive to the information regarding the detected parameter, transmitting data to the sporting device that associates the first selection with a third visual indicia.

12. The device of claim 1, further comprising an energy scavenging power supply.

13. The device of claim 1, wherein the energy scavenging power supply is configured to scavenge power from motion forces during the first and the second athletic routines and further configured to provide power to the display device during the first and second athletic routines.

14. A football having a first end and an opposite second end, the football comprising:

a display device configured to provide a visually-perceivable output from an outer surface of the football;

a sensor configured to detect a motion parameter of the football during performance of a selected athletic routine;

a processor and a non-transitory computer-readable medium, wherein the computer-readable medium comprises computer-executable instructions that when executed by the processor perform a method comprising:

receiving an electronic signal indicative of a user input selecting one of a plurality of selections that each are configured to alter a visually-perceivable property of the display device's output, wherein a first selection is configured to provide a first visual indicia and a second selection is configured to provide a second visual indicia;

wherein the user input is received from a source selected from the group consisting of: a fitness structure of the sporting device, an external electronic device, and combinations thereof;

after receiving an electronic signal indicative of the first selection has been chosen by a first athlete, displaying a first visual indicia positioned about said first end configured to be visually-perceivable by a second athlete during the first athletic routine; and responsive to the athletic performance of a first athlete during the first athletic routine, providing a second visual indicia positioned about said second end configured to be viewable to a second athlete as the football travels in a direction away from the second athlete.

15. The football of claim 14, wherein the user input is received from a fitness structure of the football.

16. The football of claim 15, wherein the football is an American football and the football comprises at least one lace of the American football.

17. The football of claim 14, wherein the user input is received from an external electronic device.

18. The football of claim 17, wherein the football comprises a wireless transceiver configured to communicate with the external electronic device.

19. The football of claim 18, further comprising:

a sensor configured to detect a motion parameter of the football during a selected athletic routine and the computer-readable medium further comprises computer-executable instructions that when executed by the processer perform a method comprising: during the performance of the first athletic routine with the football, detecting a parameter selected from the group consisting of: an athletic performance parameter, a motion parameter of the football, and combinations thereof; and transmitting information regarding the detected parameter to the external electronic device.

20. The football of claim 19, wherein the computer-readable medium further comprises computer-executable instructions that when executed by the processor perform a method comprising:

responsive to the information regarding the detected parameter, transmitting data to the football that associates the first selection with a third visual indicia.

21. The football of claim 14, further comprising an energy scavenging power supply.

22. The football of claim 21, wherein the energy scavenging power supply is configured to scavenge power from motion forces during the first and the second athletic routines and further configured to provide power to the display device during the first and second athletic routines.

23. The football of claim 14, wherein the first athletic routine comprises a sport-specific training exercise.

24. The football of claim 14, wherein the first athletic routine improves a single sport-specific skill.

25. The football of claim 23, wherein the first athletic routine is a sporting event with at least two opposing athletes and conducted in association with defined rules.

26. The football of claim 14, wherein the display device comprises at least one chromatic material.

27. The football of claim 14, wherein the display device comprises at least one electro chrome.

28. The football of claim 27, wherein the computer-readable medium comprises computer-executable instructions that when executed by a processor perform the method of: upon receiving the electronic signal selecting the first athletic routine, transmitting an electronic signal to a first electro chrome to switch the first electro chrome from a first state to a second state.

29. The football of claim 28, wherein the first electro chrome is substantially transparent while at the first state and the first electro chrome exhibits a first color while at the second state.

30. The football of claim 14, wherein the display device comprises at least two electro chromes and wherein the computer-readable medium comprises computer-executable instructions that when executed by a processor perform the method of: switching the second electro chrome from a first state to a second state responsive to receiving an electronic signal indicative that a user input selects the second athletic routine.

31. The football of claim 14, wherein the display devices comprise at least one material selected from the group consisting of: thermo chrome, photo chrome, electro chrome, and combinations thereof.

* * * * *